US012774387B2

(12) United States Patent
Sangregorio et al.

(10) Patent No.: US 12,774,387 B2
(45) Date of Patent: Oct. 27, 2026

(54) POLYCARBONATE COMPOSITION, METHOD FOR THE MANUFACTURE THEREOF, AND ARTICLES FORMED THEREFROM

(71) Applicant: SHPP GLOBAL TECHNOLOGIES B.V., Bergen op Zoom (NL)

(72) Inventors: Anna Sangregorio, Breda (NL); Mark Adrianus Johannes van der Mee, Etten Leur (NL); Tony Farrell, Bergen op Zoom (NL); Peter Vollenberg, Evansville, IN (US); Rahul Patil, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 660 days.

(21) Appl. No.: 18/037,152

(22) PCT Filed: Nov. 18, 2021

(86) PCT No.: PCT/IB2021/060680

§ 371 (c)(1),
(2) Date: May 16, 2023

(87) PCT Pub. No.: WO2022/107028

PCT Pub. Date: May 27, 2022

(65) Prior Publication Data

US 2024/0018353 A1 Jan. 18, 2024

(30) Foreign Application Priority Data

Nov. 18, 2020 (EP) .................................... 20208439

(51) Int. Cl.

| | |
|---|---|
| ***C08L 69/00*** | (2006.01) |
| ***C08G 77/448*** | (2006.01) |
| ***C08K 5/11*** | (2006.01) |
| ***C08K 5/524*** | (2006.01) |
| ***C08K 5/526*** | (2006.01) |
| ***C08K 5/5399*** | (2006.01) |
| *C08G 64/18* | (2006.01) |

(52) U.S. Cl.

CPC ............ *C08L 69/00* (2013.01); *C08G 77/448* (2013.01); *C08K 5/11* (2013.01); *C08K 5/524* (2013.01); *C08G 64/186* (2013.01); *C08L 2201/02* (2013.01); *C08L 2203/30* (2013.01); *C08L 2205/025* (2013.01); *C08L 2205/03* (2013.01); *C08L 2207/20* (2013.01)

(58) Field of Classification Search

None

See application file for complete search history.

(56) References Cited

U.S. PATENT DOCUMENTS

| | | | | |
|---|---|---|---|---|
| 5,380,795 | A | 1/1995 | Gosens et al. | |
| 7,232,865 | B2 | 6/2007 | DeRudder et al. | |
| 7,615,594 | B2 | 11/2009 | Hashimoto et al. | |
| 8,466,249 | B2 | 6/2013 | Gallucci et al. | |
| 8,779,040 | B2 | 7/2014 | Van Der Weele et al. | |
| 8,841,367 | B2 | 9/2014 | Zheng et al. | |
| 9,018,286 | B2 | 4/2015 | Daga et al. | |
| 9,023,923 | B2 | 5/2015 | An et al. | |
| 9,096,785 | B2 | 8/2015 | Guo et al. | |
| 9,266,541 | B2 | 2/2016 | Van Der Mee et al. | |
| 9,499,695 | B2 | 11/2016 | Tomita et al. | |
| 9,598,577 | B1 | 3/2017 | Groote et al. | |
| 9,598,578 | B1 | 3/2017 | Groote et al. | |
| 9,725,594 | B2 | 8/2017 | Atkinson et al. | |
| 9,790,363 | B2 | 10/2017 | Chen et al. | |
| 10,501,624 | B2 | 12/2019 | Jung et al. | |
| 10,655,001 | B2 | 5/2020 | Hein et al. | |
| 11,104,796 | B2 | 8/2021 | Chen et al. | |
| 11,873,375 | B2 | 1/2024 | Schwartz et al. | |
| 2002/0026008 | A1 | 2/2002 | Okamoto et al. | |
| 2005/0187372 | A1 | 8/2005 | Venderbosch et al. | |
| 2006/0074156 | A1 | 4/2006 | Ebeling et al. | |
| 2006/0142438 | A1 * | 6/2006 | Ishii ........................ | C08L 67/02 524/100 |

(Continued)

FOREIGN PATENT DOCUMENTS

| | | | |
|---|---|---|---|
| CN | 105315644 | A | 2/2016 |
| EP | 2890743 | B1 | 7/2017 |

(Continued)

OTHER PUBLICATIONS

First Office Action for the corresponding Chinese Application No. 202180073883.7, Date of Issue: May 23, 2025; 10 pages, English translation.

Written Opinion for the corresponding International Application No. PCT/IB2021/060680, Date of Mailing: Jan. 26, 2022; 6 pages.

International Search Report for the corresponding International Application No. PCT/IB2021/060680, Date of Mailing: Jan. 26, 2022; 6 pages.

Van de Grampel et al., "New Polycarbonate-Polysiloxane Copolymer Blend Resins for Consumer Electronic Applications", Antec, 2014, pp. 2375-2378.

U.S. Non-Final Office Action dated Dec. 4, 2025 for U.S. Appl. No. 18/037,399, 10 pages.

(Continued)

*Primary Examiner* — David J Buttner

(74) *Attorney, Agent, or Firm* — CANTOR COLBURN LLP

(57) ABSTRACT

A polycarbonate composition includes particular amounts of a bisphenol A polycarbonate homopolymer, a first polycarbonate-siloxane copolymer having a siloxane content of 10 to 30 weight percent, based on the total weight of the first polycarbonate-siloxane copolymer, a second polycarbonate-siloxane copolymer having a siloxane content of greater than 30 to 55 weight percent, preferably 35 to 50 weight percent, based on the total weight of the second polycarbonate-siloxane copolymer, and an organophosphorus flame retardant. Methods of making the composition and articles including the composition are also described.

17 Claims, No Drawings

(56) References Cited

U.S. PATENT DOCUMENTS

| | | | |
|---|---|---|---|
| 2007/0129492 A1 | 6/2007 | Colborn et al. | |
| 2007/0148257 A1* | 6/2007 | Gerace | A01N 59/16 424/600 |
| 2008/0015289 A1 | 1/2008 | Siripurapu | |
| 2012/0288654 A1 | 11/2012 | Gallucci et al. | |
| 2012/0302663 A1* | 11/2012 | Park | C08L 69/00 523/122 |
| 2013/0190425 A1 | 7/2013 | Zhu et al. | |
| 2013/0313493 A1 | 11/2013 | Wen et al. | |
| 2013/0317142 A1 | 11/2013 | Chen et al. | |
| 2014/0058023 A1 | 2/2014 | Want et al. | |
| 2014/0107264 A1 | 4/2014 | Van Der Weele et al. | |
| 2014/0179821 A1 | 6/2014 | Morizur et al. | |
| 2014/0179843 A1 | 6/2014 | Van Der Mee et al. | |
| 2014/0326162 A1 | 11/2014 | Van Der Mee et al. | |
| 2014/0357769 A1 | 12/2014 | Zheng et al. | |
| 2016/0326366 A1 | 11/2016 | Sybert et al. | |
| 2017/0044363 A1* | 2/2017 | Okamoto | C08L 55/02 |
| 2017/0129997 A1 | 5/2017 | Lyakhovych et al. | |
| 2017/0137621 A1 | 5/2017 | Groote et al. | |
| 2017/0247539 A1 | 8/2017 | Chen et al. | |
| 2017/0369702 A1 | 12/2017 | Li et al. | |
| 2018/0066134 A1 | 3/2018 | Aoki et al. | |
| 2018/0237609 A1 | 8/2018 | Ishikawa et al. | |
| 2018/0251636 A1 | 9/2018 | Abe et al. | |
| 2020/0010683 A1 | 1/2020 | Ishikawa et al. | |
| 2020/0369875 A1 | 11/2020 | Shan et al. | |
| 2021/0198481 A1 | 7/2021 | Huang et al. | |
| 2021/0284837 A1 | 9/2021 | Ishikawa et al. | |

FOREIGN PATENT DOCUMENTS

| | | | |
|---|---|---|---|
| EP | 3572453 | A1 | 11/2019 |
| EP | 3712209 | A1 | 9/2020 |
| JP | 07216080 | A | 8/1995 |
| JP | 2015137308 | A | 7/2015 |
| KR | 20070018801 | A | 2/2007 |
| KR | 101741174 | | 5/2017 |
| KR | 20190019634 | A | 2/2019 |
| WO | 2013066000 | A1 | 5/2013 |
| WO | 2013175448 | A1 | 11/2013 |
| WO | 2014032616 | A1 | 3/2014 |
| WO | 2016063154 | A1 | 4/2016 |
| WO | 2016174592 | A1 | 11/2016 |
| WO | 2019062472 | A1 | 4/2019 |
| WO | 2019123029 | A1 | 6/2019 |
| WO | 2020079565 | A1 | 4/2020 |
| WO | 2020178709 | A1 | 9/2020 |
| WO | 2022106912 | A1 | 5/2022 |
| WO | 2022107029 | A1 | 5/2022 |
| WO | 2022107030 | A1 | 5/2022 |

OTHER PUBLICATIONS

U.S. Non-Final Office Action dated Nov. 14, 2025 for U.S. Appl. No. 18/037,170; 12 pages.

* cited by examiner

POLYCARBONATE COMPOSITION, METHOD FOR THE MANUFACTURE THEREOF, AND ARTICLES FORMED THEREFROM

CROSS-REFERENCE TO RELATED APPLICATIONS

This application is a National Stage application of PCT/IB2021/060680, filed Nov. 18, 2021, which claims priority to and the benefit of European Patent Application No. 20208439.8, filed on Nov. 18, 2020, the contents of both of which are incorporated by reference herein in their entirety.

BACKGROUND

Polycarbonate homopolymers and polycarbonate copolymers are useful in a wide variety of applications at least in part because of their good balance of properties, such as moldability, heat resistance and impact properties, among others. Despite extensive research on these materials over the years, there still remains a need in the art for improved polycarbonate compositions that meet increasingly stringent industry standards.

For example, polycarbonate-polysiloxane copolymers can have good mechanical properties and low temperature impact resistance. However, chemical resistance can be difficult to achieve. There is also a need for compositions that can further exhibit good flame retardance without sacrificing chemical resistance and impact properties. Achieving this balance of properties, especially in the absence of halogenated flame retardants, is challenging.

There accordingly remains a need in the art for polycarbonate compositions that can have balanced mechanical properties including low temperature impact, chemical resistance, and flame retardance.

SUMMARY

A polycarbonate composition comprises 10 to 99 weight percent, based on the total weight of the polycarbonate composition, of a bisphenol A polycarbonate homopolymer; a first polycarbonate-siloxane copolymer having a siloxane content of 10 to 30 weight percent, based on the total weight of the first polycarbonate-siloxane copolymer; a second polycarbonate-siloxane copolymer having a siloxane content of greater than 30 to 70 weight percent, preferably 35 to 65 weight percent, based on the total weight of the second polycarbonate-siloxane copolymer; wherein the first polycarbonate-siloxane copolymer and the second polycarbonate-siloxane copolymer are present in an amount to provide a total siloxane content of 0.5 to 20 weight percent, based on the total weight of the polycarbonate composition; and 0.5 to 5 weight percent, based on the total weight of the polycarbonate composition, of an organophosphorus flame retardant.

A method of making the polycarbonate composition comprises melt-mixing the components of the composition, and, optionally, extruding the composition.

An article comprises the polycarbonate composition.

The above described and other features are exemplified by the description.

DETAILED DESCRIPTION

Provided herein are polycarbonate compositions having a desirable combination of properties, including flame retardance, impact strength, and chemical resistance. The present inventors have determined that such properties can be obtained with a polycarbonate composition including particular amounts of a bisphenol A polycarbonate homopolymer, a first polycarbonate-siloxane copolymer having a siloxane content of 10 to 30 weight percent, a second polycarbonate-siloxane copolymer having a siloxane content of greater than 30 to 70 weight percent, and an organophosphorus flame retardant.

Accordingly, an aspect is a polycarbonate composition. The polycarbonate composition comprises a bisphenol A polycarbonate homopolymer, also referred to as a bisphenol A homopolycarbonate. The bisphenol A polycarbonate homopolymer has repeating structural carbonate units of the formula (1).

(1)

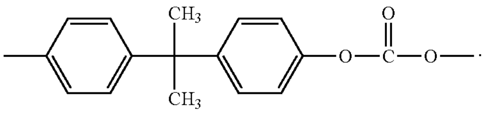

Bisphenol A polycarbonate homopolymers can be manufactured by processes such as interfacial polymerization and melt polymerization, which are known, and are described, for example, in WO 2013/175448 A1 and WO 2014/072923 A1, from bisphenol A ((2,2-bis(4-hydroxyphenyl)propane, or BPA). An endcapping agent can be included during polymerization to provide end groups, for example monocyclic phenols such as phenol, p-cyanophenol, and $C_{1-22}$ alkyl-substituted phenols such as p-cumyl-phenol, resorcinol monobenzoate, and p-tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Phenol and para-cumylphenol are specifically mentioned. Combinations of different endcapping agents can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 4.0 weight percent (wt %), for example, 0.05 to 2.0 wt %. Combinations comprising linear polycarbonates and branched polycarbonates can be used.

The bisphenol A polycarbonate homopolymer can be a linear bisphenol A polycarbonate homopolymer, optionally endcapped with phenol or para-cumylphenol, and having a weight average molecular weight of 10,000 to 100,000 grams per mole (g/mol), preferably 15,000 to 40,000 g/mol, as measured by gel permeation chromatography (GPC), using a crosslinked styrene-divinylbenzene column and calibrated to bisphenol A polycarbonate references. GPC samples are prepared at a concentration of 1 milligram per milliliter (mg/mL) and are eluted at a flow rate of 1.5 ml per minute. The bisphenol A polycarbonate homopolymer can comprise a linear bisphenol A polycarbonate homopolymer having a weight average molecular weight of 15,000 to 25,000 grams per mole, preferably 17,000 to 25,000 grams per mole, as determined by GPC. The bisphenol A polycarbonate homopolymer can comprise a linear bisphenol A polycarbonate homopolymer having a weight average molecular weight of 26,000 to 40,000 grams per mole, preferably 27,000 to 35,000 grams per mole, as determined by GPC.

In an aspect, more than one bisphenol A polycarbonate homopolymer can be present. For example, the bisphenol A polycarbonate homopolymer can comprise a first bisphenol A polycarbonate homopolymer having a weight average molecular weight of 15,000 to 25,000 g/mol or 17,000 to 23,000 g/mol or 18,000 to 22,000 g/mol, and a second bisphenol A polycarbonate homopolymer having a weight average molecular weight of 26,000 to 40,000 g/mol or 26,000 to 35,000 g/mol, each measured by GPC using BPA homopolycarbonate standards. The weight ratio of the first bisphenol A polycarbonate homopolymer relative to the second bisphenol A polycarbonate homopolymer is 10:1 to 1:10, preferably 5:1 to 1:5, more preferably 3:1 to 1:3 or 2:1 to 1:2.

The bisphenol A polycarbonate homopolymer can be present in an amount of 10 to 99 weight percent, based on the total weight of the polycarbonate composition. Within this range, the bisphenol A polycarbonate homopolymer can be present in an amount of 50 to 99 weight percent, or 60 to 90 weight percent, or 65 to 85 weight percent, or 50 to 85 weight percent, or 50 to 90 weight percent, or 60 to 85 weight percent.

In addition to the bisphenol A polycarbonate homopolymer, the polycarbonate composition comprises a first polycarbonate-siloxane copolymer and a second polycarbonate-siloxane copolymer. Polycarbonate-siloxane copolymers are also known as polycarbonate-siloxanes. Both the first and the second polycarbonate-siloxane copolymer comprise carbonate repeat units and siloxane units. The carbonate units can be derived from a dihydroxy aromatic compound such as a bisphenol of formula (2) or a diphenol of formula (3)

(2)

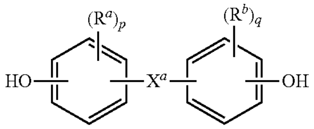

(3)

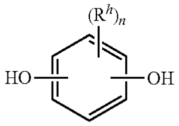

wherein in formula (2) Ra and $R^b$ are each independently $C_{1-12}$ alkyl, $C_{1-12}$ alkenyl, $C_3$ cycloalkyl, or $C_{1-12}$ alkoxy, p and q are each independently 0 to 4, and $X^a$ is a single bond, —O—, —S—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, or a group of the formula —$C(=R^C)$— wherein $R^c$ is a divalent $C_{1-10}$ hydrocarbon group; and in formula (3), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In an aspect in formulas (2) and (3), Ra and $R^b$ are each independently $C_1$-3 alkyl or $C_{1-3}$ alkoxy, p and q are each independently 0 or 1, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, each $R^h$ is independently bromine, a $C_{1-3}$ alkyl, a halogen-substituted $C_1$-3 alkyl, and n is 0 to 1.

In an aspect in formulas (2) and (3), Ra and $R^b$ are each independently $C_{1-3}$ alkyl, p and q are each independently 0 or 1, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, each $R^h$ is independently bromine, a $C_1$-3 alkyl, a halogen-substituted $C_1$-3 alkyl, and n is 0 to 1.

In an aspect in formula (2), p and q are each independently 0, and $X^a$ is a single bond, —O—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl.

In an aspect in formula (2), p and q are each independently 0, and $X^a$ is a $C_{1-11}$ alkylidene of formula —$C(R^c)(R^d)$— wherein $R^c$ and $R^d$ are each independently hydrogen or $C_{1-10}$ alkyl.

In an aspect in formula (2), p and q are each independently 0, and $X^a$ is a $C_{1-11}$ alkylidene of formula —$C(R^c)(R^d)$— wherein $R^c$ and $R^d$ are each independently $C_{1-10}$ alkyl, preferably methyl.

Examples of bisphenol compounds (2) include BPA, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane (spirobiindane bisphenol), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole. A combination comprising different bisphenol compounds can be used.

Examples of diphenol compounds (3) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

In an aspect the carbonate units can be bisphenol carbonate units derived from bisphenols of formula (2). A preferred bisphenol is BPA.

The siloxane units (also referred to as polysiloxane blocks) are optionally of formula (4)

(4)

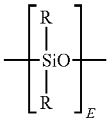

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_3$-6 cycloalkyl, $C_3$-6 cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

In an aspect, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In an aspect, R is methyl, trifluoromethyl, or phenyl, preferably methyl.

The value of E in formula (4) can vary widely depending on the type and relative amount of each component in the polycarbonate composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, in still another aspect, E has an average value of 40 to 80 or 40 to 70, and in yet another aspect, E has an average value of 10 to 100, or 20 to 60, or 30 to 50.

In an aspect, the siloxane units are of formula (5)

(5)

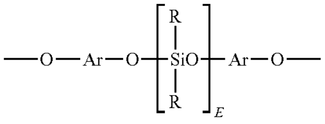

wherein E is as defined above in the context of formula (4); each R can be the same or different, and is as defined above in the context of formula (4); and Ar can be the same or different, and is a substituted or unsubstituted $C_{6-30}$ arylene, wherein the bonds are directly connected to an aromatic moiety. Ar groups in formula (5) can be derived from a $C_{6-30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (5a) and (5b).

(5a)

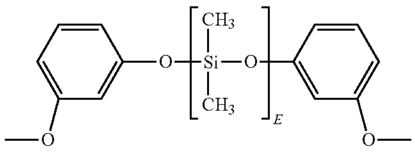

(5b)

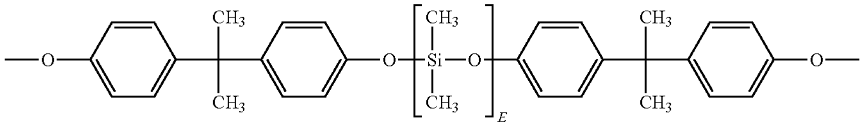

In an aspect, the siloxane units are of formula (6)

(6)

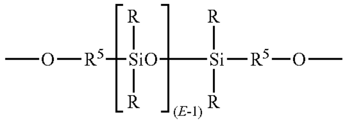

wherein R and E are as described above in the context of formula (4), and each $R^5$ is independently a divalent $C_1$-30 organic group, and wherein the polymerized polysiloxane unit is the reaction residue of its corresponding dihydroxy compound. In an aspect, the polydiorganosiloxane blocks are of formula (7):

(7)

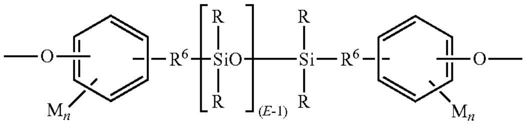

wherein R and E are as defined above in the context of formula (4). $R^6$ in formula (7) is a divalent $C_{2-8}$ aliphatic group. Each M in formula (7) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In an aspect, R is methyl, or a combination of methyl and trifluoropropyl, or a combination of methyl and phenyl. In an aspect, R is methyl, M is methoxy, n is one, and $R^6$ is a divalent $C_1$-3 aliphatic group. Specific polydiorganosiloxane blocks are of the formula (7a)

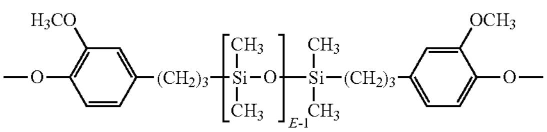

, (7b)

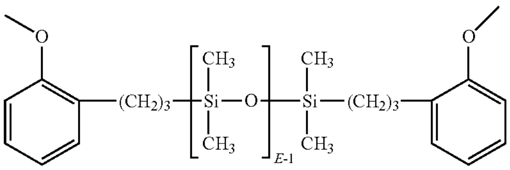

, (7c)

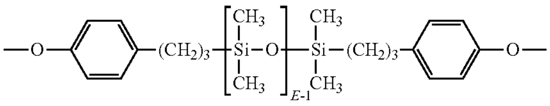

, or a combination thereof, wherein E has an average value of 10 to 100, preferably 20 to 60, more preferably 30 to 50, or 40 to 50.

Blocks of formula (7) can be derived from the corresponding dihydroxy polydiorganosiloxanes by known methods. The polycarbonate-siloxane can be manufactured by introducing phosgene under interfacial reaction conditions into a mixture of bisphenol and an end capped polydimethylsiloxane (PDMS). Other known methods can also be used.

In an aspect, the poly(carbonate-siloxane) comprises carbonate units derived from bisphenol A, and repeating siloxane units (5a), (5b), (7a), (7b), (7c), or a combination thereof (preferably of formula 7a), wherein E has an average value of 10 to 100, preferably 20 to 80, or 30 to 70, more preferably 30 to 50 or 40 to 50.

The present inventors have unexpectedly discovered that the polycarbonate composition can exhibit a desirable combination of properties including good chemical resistance, flame retardance, and impact strength when a particular combination of polycarbonate-siloxane copolymers is used in the composition.

The first polycarbonate-siloxane copolymer can have a siloxane content of 10 to 30 weight percent, based on the total weight of the first polycarbonate-siloxane copolymer. Within this range, the first polycarbonate-siloxane copolymer can have a siloxane content of 15 to 25 weight percent. As used herein, "siloxane content" of a poly(carbonate-siloxane) refers to the content of siloxane units based on the total weight of the polycarbonate-siloxane copolymer.

The second polycarbonate-siloxane copolymer can have a siloxane content of greater than 30 to 55 weight percent, based on the total weight of the second polycarbonate-siloxane copolymer. Within this range, the second polycarbonate-siloxane copolymer can have a siloxane content of 30 to 50 weight percent, or 30 to 45 weight percent, or 35 to 45 weight percent, or 35 to 40 weight percent, or 30 to 40 weight percent, or 35 to 50 weight percent, or 35 to 55 weight percent.

The first polycarbonate-siloxane copolymer can have a weight average molecular weight of 18,000 to 50,000 g/mol, preferably 25,000 to 40,000 g/mol, more preferably 27,000 to 32,000 g/mol as measured by gel permeation chromatography using a crosslinked styrene-divinyl benzene column, at a sample concentration of 1 milligram per milliliter, and as calibrated with bisphenol A polycarbonate standards.

The second polycarbonate-siloxane copolymer can have a weight average molecular weight of 21,000 to 50,000 g/mol. Within this range, the weight average molecular weight can be 25,000 to 45,000 g/mol, or 30,000 to 45,000 g/mol, or 32,000 to 43,000 g/mol, or 34,000 to 41,000 g/mol, or 35,000 to 40,000 g/mol. In an aspect, the polycarbonate-siloxane copolymer can have a weight average molecular weight of 26,000 to 45,000 g/mol, or 30,000 to 45,000 g/mol, or 35,000 to 40,000 g/mol. The weight average molecular weight can be measured by gel permeation chromatography using a crosslinked styrene-divinyl benzene column, at a sample concentration of 1 milligram per milliliter, and as calibrated with bisphenol A polycarbonate standards.

In an aspect, the composition comprises less than or equal to 5 weight percent or less than or equal to 1 weight percent, or less than or equal to 0.1 weight percent of a polycarbonate-siloxane having a siloxane content of less than or equal to 10 weight percent. Preferably a polycarbonate-siloxane having a siloxane content of less than or equal to 10 weight percent is excluded from the composition.

The first and the second polycarbonate-siloxane copolymers can be present in the composition in an amount to provide a total siloxane content of 0.5 to 20 weight percent, or 1 to 10 weight percent, or 1 to 8 weight percent, or 1 to 6 weight percent or 1.5 to 4 weight percent, each based on the total weight of the polycarbonate composition.

In an aspect, the composition can have a total siloxane content of greater than 6 to 10 weight percent, and the weight average molecular weight of the second polycarbonate-siloxane copolymer can be greater than 21,000 g/mol. In an aspect, the composition can have a total siloxane content that is greater than 4 to 6 weight percent, and the weight average molecular weight of the second polycarbonate-siloxane copolymer can be greater than 25,000 to less than 45,000 g/mol. In an aspect, the composition can have a total siloxane content that is up to 4 weight percent, and the weight average molecular weight of the second polycarbonate-siloxane copolymer can be greater than 35,000 to less than 40,000 g/mol.

The first and the second polycarbonate-siloxane copolymer can be present in a weight ratio of the first polycarbonate-siloxane copolymer to the second polycarbonate-siloxane copolymer of 1:9 to 9:1, preferably 1:1 to 5:1, more preferably 1:1 to 3:1, even more preferably 1.25:1 to 2.5:1.

In an aspect, the first polycarbonate-siloxane copolymer can be present in an amount of 5 to 25 weight percent, or 5 to 15 weight percent, based on the total weight of the polycarbonate composition. In an aspect, the second polycarbonate-siloxane copolymer can be present in an amount of 2 to 20 weight percent, or 5 to 15 weight percent, based on the total weight of the polycarbonate composition.

In an aspect, one or more of the bisphenol A homopolymer carbonate, the first polycarbonate-siloxane copolymer, and the second polycarbonate-siloxane copolymer are derived from post-consumer recycled or post-industrial recycled materials. In an aspect, one or more of the bisphenol A homopolymer carbonate, the first polycarbonate-siloxane copolymer, and the second polycarbonate-siloxane copolymer can be produced from at least one monomer derived from bio-based or plastic waste feedstock.

In addition to the bisphenol A polycarbonate homopolymer, the first polycarbonate-siloxane copolymer, and the second polycarbonate-siloxane copolymer, the polycarbonate composition further comprises an organophosphorus flame retardant. In an aspect, the organophosphorus flame retardant can comprise a phosphate ester flame retardant, an oligomeric phosphate ester flame retardant, a phosphazene flame retardant, or a combination thereof. In an aspect, the flame retardant in an oligomeric phosphate ester flame retardant. In an aspect, phosphate ester flame retardants other than the oligomeric phosphate ester flame retardant can be excluded from the composition.

In an aspect, the oligomeric phosphate ester flame retardant is present. The oligomeric phosphate ester flame retardant can comprise 5 to 15 weight percent phosphorus, based on the total weight of the oligomeric phosphate ester flame retardant. The oligomeric phosphate ester flame retardant can be a solid at room temperature (e.g., at 20 to 25° C., preferably 23° C.). An exemplary oligomeric phosphate ester flame retardant is available under the trade name FYROLFLEX SOL DP, available from ICL Industrial Products.

In an aspect, the phosphazene flame retardant can be present. Phosphazenes (8) and cyclic phosphazenes (9)

(8)

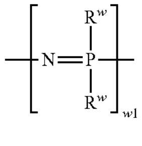

(9)

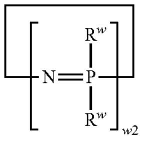

in particular can be used, wherein w1 is 3 to 10,000 and w2 is 3 to 25, preferably 3 to 7, and each $R^w$ is independently a $C_{1-12}$ alkyl, alkenyl, alkoxy, aryl, aryloxy, or polyoxyalkylene. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

In an aspect, the phosphazene flame retardant can comprise a cyclic phosphazene. In an aspect, the phosphazene flame retardant comprises phenoxy cyclotriphosphazene, octaphenoxy cyclotetraphosphazene decaphenoxy cyclopentaphosphazene, hexaphenoxycyclotriphosphazene or a combination thereof. In an aspect, the phosphazene can comprise hexaphenoxycyclotriphosphazene.

In an aspect the phosphate ester flame retardant can be present. The phosphate ester is preferably an aromatic phosphate ester. Exemplary aromatic phosphates can include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), resorcinol bis(di-2,6-xylylphosphate) (RDX), the bis(diphenyl) phosphate of hydroquinone and the bis(diphenyl) phosphate of bisphenol A, respectively, and their oligomeric and polymeric counterparts. In an aspect, the phosphate ester flame retardant can be resorcinol bis(di-2,6-xylylphosphate).

The flame retardant can be present in an amount of 0.5 to 5 weight percent, based on the total weight of the polycarbonate composition. Within this range, the flame retardant can be present in an amount of 1 to 5 weight percent, or 1.5 to 4 weight percent, or 1.5 to 3.5 weight percent. In an aspect, the flame retardant can comprise the oligomeric phosphate ester and can be present in the composition in an amount of 0.5 to 5 weight percent, or 1 to 5 weight percent, or 2 to 4 weight percent or 2.5 to 3.5 weight percent. In an aspect, the flame retardant can comprise the phosphazene and can be present in an amount of 0.5 to 5 weight percent, or 0.5 to 4 weight percent, or 1 to 3 weight percent, or 1.5 to 2.5 weight percent. In an aspect, the flame retardant can comprise the phosphate ester flame retardant and can be present in an amount of 0.5 to 5 weight percent, or 1 to 5 weight percent, or 2 to 4 weight percent or 3 to 4 weight percent.

The polycarbonate composition can optionally further comprise an additive composition comprising one or more additives ordinarily incorporated into polymer compositions of this type, provided that the one or more additives are selected so as not to significantly adversely affect the desired properties of the polycarbonate composition, in particular impact, chemical resistance, and flame retardance. Additives can include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 weight percent, based on the total weight of the polycarbonate composition. In an aspect, the polycarbonate composition comprises no more than 5 weight percent based on the weight of the composition of a processing aid, a heat stabilizer, an antioxidant, an ultraviolet light absorber, or a combination thereof.

In an aspect, the polycarbonate composition can optionally comprise anti-drip agents. The anti-drip agent can be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

In an aspect, the polycarbonate composition can optionally comprise an antimicrobial agent. Any antimicrobial agent generally known can be used either individually or in combination (i.e., of two or more). Exemplary antimicrobial agents can include, but are not limited to a metal containing agent, such as Ag, Cu, Al, Sb, As, Ba, Bi, B, Au, Pb, Hg, Ni, Th, Sn, Zn containing agent. In an aspect, the agent can be Ag containing agent. A suitable Ag containing agent can contain a silver ion, colloidal silver, silver salt, silver complex, silver protein, silver nanoparticle, silver functionalized clay, zeolite containing silver ions or any combinations thereof. Silver salts or silver complexes can include silver acetate, silver benzoate, silver carbonate, silver ionate, silver iodide, silver lactate, silver laureate, silver nitrate, silver oxide, silver palpitate, silver sulfadiazine, silver sulfate, silver chloride, or any combinations thereof.

When present, the antimicrobial agent can be included in an amount of 0.001 to 10 weight percent, based on the total weight of the polycarbonate composition. In an aspect, the composition can contain a Ag containing agent(s) in amounts such that and the silver content in the composition of 0.01 wt. % to 5 wt. %.

The polycarbonate composition can optionally exclude other components not specifically described herein. For example, the polycarbonate composition can exclude thermoplastic polymers other than the bisphenol A homopolycarbonate, and the first and the second polycarbonate-siloxane copolymers. For example the composition can minimize or exclude polyesters (e.g., a polyester can be present in an amount of 1 weight percent or less, preferably wherein a polyester is excluded from the composition). The composition can optionally exclude a polycarbonate other than the bisphenol A homopolycarbonate and the polycarbonate-siloxane copolymer, for example a polyester-carbonate or a bisphenol A copolycarbonate different from the polycarbonate-siloxane copolymer. The polycarbonate can optionally exclude impact modifiers, for example silicone-based impact modifiers different from the poly(carbonate-siloxane) copolymer, methyl methacrylate-butadiene-styrene copolymers, acrylonitrile-butadiene, styrene copolymers, and the like, or a combination thereof. The composition can exclude halogenated flame retardants, for example brominated flame retardants, including brominated polycarbonate (e.g., a polycarbonate containing brominated carbonate includes units derived from 2,2',6,6'-tetrabromo-4,4'-isopropylidenediphenol (TBBPA) and carbonate units derived from at least one dihydroxy aromatic compound that is not TBBPA), brominated epoxies, and the like or combinations thereof. The composition can optionally exclude inorganic flame retardants.

The composition can advantageously exhibit one or more desirable properties. For example, it was found that improved chemical resistance can unexpectedly be obtained by combining a polycarbonate, preferably a bisphenol A polycarbonate homopolymer, with a first poly(carbonate-siloxane) and a second polycarbonate-siloxane, each having a particular siloxane content. In particular, at the same total siloxane loading level, compositions containing a single polycarbonate-siloxane can have less chemical resistance than the compositions described herein. These compositions can have balanced properties, including two or more of chemical resistance, flame retardance, impact, and flow properties. Without wishing to be bound by theory, it is believed that the unexpected combination of chemical resistance, flame retardance, impact, and flow properties is achieved by careful selection and balancing of the first and second polycarbonate-siloxane copolymers used in the composition including the selection of weight percent of the siloxane units in the polycarbonate-siloxane, as well as careful selection of the flame retardant component.

The composition can have good chemical resistance. In an exemplary aspect, the polycarbonate composition can have a tensile elongation retention of at least 80% after exposure of an ISO tensile bar for 72 hours to SANI-CLOTH AF3 at a temperature of 23° C. under 1% strain compared to a non-exposed reference tested at the same temperature.

The polycarbonate composition can further have good flame retardant properties. In an aspect of measuring flame retardance, the UL94 standard utilizes a rating of V0, V1, V2 or HB, wherein a rating of V0 is better than V1 or V2 and is required for many applications at the actual part thickness. Using this standard, the polycarbonate compositions are formed into a molded article having a given thickness. The thinner the article, the more difficult it is to achieve a rating of V0 or V1. In as aspect, a molded sample of the polycarbonate composition is capable of achieving UL-94 V0 rating at a thickness of 1.5 millimeters or less, preferably a UL-94 rating of V0 at a thickness of less than or equal to 1.2 millimeters; more preferably a UL-94 rating of V0 at a thickness of less than or equal to 1.0 millimeters.

The polycarbonate composition can further have good impact properties, in particular Izod notched impact strength. In an aspect, the composition can have an Izod notched impact energy of at least 600 joules per meter measured at 23° C. on a sample of 3.2 mm thickness according to ASTM D256-10. The composition can also have an Izod notched impact energy of at least 450 joules per meter measured at −30° C. on a sample of 3.2 mm thickness according to ASTM D256-10.

The polycarbonate composition can further have good melt viscosity, which aids in processing. The polycarbonate composition can have a melt volume rate (MVR, cubic centimeters per 10 minutes ($cm^3$/10 min)) of 5 to 20 or 7 to 15, greater or equal to 5, or greater than or equal to 8, determined in accordance with ISO 1133 under a load of 1.2 kg at 300° C.

The polycarbonate composition can have a heat deflection temperature (HDT) of 110° C. or higher as measured on a sample plaque of 4 mm thickness at 1.82 MPa according to ISO75.

In an aspect, the polycarbonate composition can have a tensile elongation retention of at least 80% after exposure of an ISO tensile bar for 72 hours to SANI-CLOTH AF3 at a temperature of 23° C. under 1% strain compared to a non-exposed reference tested at the same temperature; a UL-94 V0 rating at a thickness of 1.5 millimeters or less, preferably a UL-94 rating of V0 at a thickness of less than or equal to 1.2 millimeters; more preferably a UL-94 rating of V0 at a thickness of less than or equal to 1.0 millimeters, an Izod notched impact energy of at least 600 joules per meter measured at 23° C. on a sample of 3.2 mm thickness according to ASTM D256-10, an Izod notched impact energy of at least 450 joules per meter measured at −30° C. on a sample of 3.2 mm thickness according to ASTM D256-10, a melt volume rate (MVR, cubic centimeters per 10 minutes ($cm^3$/10 min)) of 5 to 20 or 7 to 15, greater or equal to 5, or greater than or equal to 8, determined in accordance with ISO 1133 under a load of 1.2 kg at 300° C., and a heat deflection temperature (HDT) of 110° C. or higher as measured on a sample plaque of 4 mm thickness at 1.82 MPa according to ISO75.

In an aspect, the polycarbonate composition can advantageously exhibit the above UL-94 rating, tensile elongation retention, and notched impact strength at a temperature of 23° C., and can optionally further exhibit one or more of the above notched impact strength at −30° C., heat deflection temperature, and a melt volume flow rate.

The polycarbonate composition can comprise 10 to 99 weight percent, based on the total weight of the polycarbonate composition, of a bisphenol A polycarbonate homopolymer; a first polycarbonate-siloxane copolymer having a siloxane content of 10 to 30 weight percent, based on the total weight of the first polycarbonate-siloxane copolymer; a second polycarbonate-siloxane copolymer having a siloxane content of greater than 30 to 55 weight percent, preferably 35 to 50 weight percent, based on the total weight of the second polycarbonate-siloxane copolymer; wherein the first polycarbonate-siloxane copolymer and the second polycarbonate-siloxane copolymer are present in an amount to provide a total siloxane content of 0.5 to 20 weight percent, based on the total weight of the polycarbonate composition; and 0.5 to 5 weight percent, based on the total weight of the polycarbonate composition, of an oligomeric phosphate ester flame retardant, a phosphazene flame retardant, or a combination thereof. A molded sample comprising the polycarbonate composition can exhibit one or more of: a UL-94 rating of V0 at a thickness of 1.5 millimeters or less; preferably a UL-94 rating of V0 at a thickness of less than or equal to 1.2 millimeters; more preferably a UL-94 rating of V0 at a thickness of less than or equal to 1.0 millimeters; a tensile elongation retention of at least 80% after exposure to SANI-CLOTH AF3 for 72 hours at a temperature of 23° C. under 1% strain compared to non-exposed reference sample of the same composition, both measured per ISO 527 at a rate of 50 mm/s; a heat deflection temperature of greater than 110° C., as determined according to ISO75 under load of 1.8 MPa; an Izod notched impact strength of greater than 600 joules per meter at a temperature of 23° C., as determined according to ASTM D256-10; or an Izod notched impact strength of greater than 450 joules per meter at a temperature of −30° C., as determined according to ASTM D256-10. The bisphenol A polycarbonate homopolymer can comprise a linear bisphenol A polycarbonate homopolymer having a weight average molecular weight of 15,000 to 40,000 grams per mole, as determined by gel permeation chromatography relative to linear bisphenol A polycarbonate standards, preferably the bisphenol A polycarbonate homopolymer can comprise a linear bisphenol A polycarbonate homopolymer having a weight average molecular weight of 15,000 to 25,000 grams per mole, preferably 17,000 to 25,000 grams per mole, as determined by gel permeation chromatography relative to linear bisphenol A polycarbonate standards; or a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; or a combination thereof. The first polycarbonate-siloxane copolymer and the second polycarbonate-siloxane copolymer can each comprise bisphenol A carbonate repeating units and poly(dimethyl siloxane) repeating units. The first polycarbonate-siloxane copolymer can have a siloxane content of 15 to 25 weight percent based on the total weight of the first polycarbonate-siloxane copolymer, and the second polycarbonate-siloxane copolymer can have a siloxane content of 35 to 65 weight percent based on the total weight of the second polycarbonate-siloxane copolymer. The composition can be free of a polycarbonate-siloxane copolymer having a siloxane content that is less than or equal to 10 weight percent based on the total weight of the polycarbonate siloxane. The organophosphorus flame retardant can comprise a phosphate ester, an oligomeric phosphate ester, a phosphazene, or a combination thereof. The oligomeric phosphate ester flame retardant can comprise 5 to 15 weight percent phosphorus, based on the total weight of the oligomeric phosphate ester. The oligomeric phosphate ester can be a solid at room temperature. One or more of the bisphenol A homopolymer carbonate, the first polycarbonate-siloxane copolymer, and the second polycarbonate-siloxane copolymer can be derived from post-consumer recycled or post-industrial recycled materials or made with at least one monomer derived from bio-based or plastic waste feedstock. The polycarbonate composition can further comprise 0.1 to 10 weight percent, based on the total weight of the polycarbonate composition, of an additive composition. The polycarbonate composition can further comprise 0.001 to 10 weight percent of an antimicrobial agent, In an aspect, the polycarbonate composition comprises 60 to 90 weight percent, preferably 65 to 85 weight percent of the bisphenol A polycarbonate homopolymer; 5 to 25 weight percent, preferably 5 to 15 weight percent of the first polycarbonate-siloxane copolymer; 2 to 20 weight percent, preferably 3 to 15 weight percent of the second polycarbonate-siloxane copolymer; and 1 to 5 weight percent of the organophosphorus flame retardant, preferably wherein the organophosphorus flame retardant comprises the oligomeric phosphate ester flame retardant, each based on the total weight of the polycarbonate composition.

In an aspect, the polycarbonate composition comprises 60 to 90 weight percent, preferably 65 to 85 weight percent of the bisphenol A polycarbonate homopolymer; 5 to 25 weight percent, preferably 5 to 15 weight percent of the first polycarbonate-siloxane copolymer; 2 to 20 weight percent, preferably 3 to 15 weight percent of the second polycarbonate-siloxane copolymer; and 1 to 5 weight percent of the organophosphorus flame retardant, preferably wherein the organophosphorus flame retardant comprises the oligomeric phosphate ester flame retardant, each based on the total weight of the polycarbonate composition, and the bisphenol A polycarbonate homopolymer comprises a linear bisphenol A polycarbonate homopolymer having a weight average molecular weight of 15,000 to 25,000 grams per mole, preferably 17,000 to 25,000 grams per mole, as determined by gel permeation chromatography relative to linear bisphenol A polycarbonate standards, and a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; the first polycarbonate-siloxane copolymer and the second polycarbonate-siloxane copolymer each comprise bisphenol A carbonate repeating units and poly(dimethyl siloxane) repeating units; the first polycarbonate-siloxane copolymer has a siloxane content of 15 to 25 weight percent based on the total weight of the first polycarbonate-siloxane copolymer, and the second polycarbonate-siloxane copolymer has a siloxane content of 35 to 65 weight percent based on the total weight of the second polycarbonate-siloxane copolymer; and the oligomeric phosphate ester flame retardant comprises 5 to 15 weight percent phosphorus, based on the total weight of the oligomeric phosphate ester, preferably wherein the oligomeric phosphate ester is a solid at room temperature, wherein a molded sample of the polycarbonate composition exhibits a UL-94 rating of V0 at a thickness of 1.5 millimeters or less; preferably a UL-94 rating of V0 at a thickness of less than or equal to 1.2 millimeters; more preferably a UL-94 rating of V0 at a thickness of less than or equal to 1.0 millimeters; a tensile elongation retention of at least 80% after exposure to SANI-CLOTH AF3 for 72 hours at a temperature of 23° C. under 1% strain compared to non-exposed reference sample of the same composition, both measured per ISO 527 at a rate of 50 mm/s; a heat deflection temperature of greater than 110° C., as determined according to ISO75 under load of 1.8 MPa; an Izod notched impact strength of greater than 600 kilojoules per meter at a temperature of 23° C., as determined according to ASTM D256-10; or an Izod notched impact strength of greater than 450 kilojoules per meter at a temperature of −30° C., as determined according to ASTM D256-10.

The polycarbonate composition can be manufactured by various methods known in the art. For example, powdered polycarbonate homopolymer, poly(carbonate-siloxane) and other optional components are first blended, optionally with any fillers, in a high-speed mixer or by hand mixing. The blend is then fed into the throat of a twin-screw extruder via a hopper. Alternatively, at least one of the components can be incorporated into the composition by feeding it directly into the extruder at the throat and/or downstream through a side stuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate composition are also provided. The polycarbonate composition can be molded into useful shaped articles by a variety of methods, such as injection molding, extrusion, rotational molding, blow molding, and thermoforming. The article can be a molded article, a thermoformed article, an extruded film, an extruded sheet, a honeycomb structure, one or more layers of a multi-layer article, a substrate for a coated article, and a substrate for a metallized article. Exemplary articles can include medical housings, automotive components, and consumer electronics.

This disclosure is further illustrated by the following examples, which are non-limiting.

EXAMPLES

Materials used in the following examples are described in Table 1

TABLE 1

| Component | Description | Supplier |
|---|---|---|
| PCSi-1 | Bisphenol A polycarbonate-polydimethylsiloxane block copolymer having a siloxane content of 6 weight percent, average PDMS block length of 45 units, having a Mw of 22,000 to 24,000 grams per mole as determined by gel permeation chromatography relative to linear bisphenol A polycarbonate standards, produced by interfacial polymerization and endcapped with p-cumylphenol | SABIC |
| PCSi-2 | Bisphenol A polycarbonate-polydimethylsiloxane block copolymer having a siloxane content of 20 weight percent, average PDMS block length of 45 units, having a Mw of 29,500 to 30,500 grams per mole as determined by gel permeation chromatography relative to linear bisphenol A polycarbonate standards, produced by interfacial polymerization and endcapped with p-cumylphenol | SABIC |
| PCSi-3 | Polycarbonate-siloxane copolymer having a siloxane content of 40 weight percent, average PDMS block length of 45 units, having a Mw of 37,000 to 38,000 grams per mole as determined by gel permeation chromatography relative to linear bisphenol A polycarbonate standards, produced by interfacial polymerization and endcapped with p-cumylphenol | SABIC |
| PC-1 | Linear bisphenol A polycarbonate, CAS Reg. No, 25971-63-5, having a molecular weight (Mw) of 30,000-31,000 grams per mole, as determined by gel permeation chromatography relative to linear bisphenol A polycarbonate standards, produced by interfacial polymerization and endcapped with p-cumylphenol | SABIC |

TABLE 1-continued

| Component | Description | Supplier |
|---|---|---|
| PC-2 | Linear bisphenol A polycarbonate having a Mw of 20,000-22,000 grams per mole, as determined by gel permeation chromatography relative to linear bisphenol A polycarbonate standards, produced by interfacial polymerization and endcapped with p-cumylphenol | SABIC |
| TBPP | Tris(2,4-di-tert-butylphenyl) phosphite, CAS Reg. No. 31570-04-4; obtained as IRGAFOS ™ 168 | BASF |
| PETS | Pentaerythritol tetrastearate, CAS Reg. No. 115-83-3 | FACI SpA |
| KPFBS | Potassium Perfluorobutane Sulfonate, CAS Reg. No. 29420-49-3 | 3M |
| Phosphazene | Phenoxycyclophosphazene; obtained as RABITLE FP-110 | Fushimi Pharmaceutical Co., Ltd. |
| RDX | Resorcinol bis(di-2,6-xylylphosphate), obtained as PX-200 | Daihachi Chemical Ind. |
| SOLDP | Solid oligomeric phosphate ester; (free flowing powder at 23° C.), having 10.5 percent phosphorus by weight; commercially available as FYROLFLEX Sol-DP | ICL Industrial Products |
| UVA | 2-[2-hydroxy-3,5-di-(1,1-dimethylbenzyl)]-2H-benzotriazol, obtained as TINUVIN 234 | BASF |
| TSAN | Poly(styrene-acrylonitrile)-encapsulated polytetrafluoroethylene, containing 50 weight percent polytetrafluoroethylene; obtained as INP449 | SABIC |

The compositions of the following examples were prepared by blending the components together and extruding on a 37 mm twin-screw extruder at a melt temperature between 280 to 330° C., though it will be recognized by one skilled in the art that the method is not limited to these temperatures. The compositions were subsequently injection molded at a temperature of 270 to 380° C., though it will be recognized by one skilled in the art that the method is not limited to these temperatures.

Physical measurements were made using the tests and test methods described below.

Heat deflection temperature (HDT) was determined in accordance with ISO75 on a sample plaque of 4.00 mm thickness at 1.82 MPa.

Notched Izod impact Strength (INI) was determined in accordance with ASTM D256-10 under a load of 5.5 lbf at different temperatures including a temperature of 23° C. or −30° C. All ASTM INI determinations were carried out on sample plaques of 3.2 mm thickness. For the test at −30° C., the test specimens were placed in the freezer for more than 4 hours then taken out for testing at room temperature within five seconds.

Melt volume rate (MVR) was determined in accordance with ISO 1133 under a load of 1.2 kg at 300° C. with a dwell time of 300 seconds. Before testing, the pellets were pre-dried at 120° C. for 3 hours.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, 5VA, or 5VB. The test specimens were aged at 23° C., 50% RH for more than 2 days or 70° C. for 168 hours before testing. Specifically, in the UL 94 20 mm Vertical Burning Flame Test, a set of five flame bars was tested. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for each individual specimen must have been less than or equal to 10 seconds; and the total afterflame time for all five specimens (t1 plus t2 for all five specimens) must have been less than or equal to 50 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all five specimens (t1 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating ofV-2, the afterflame times t1 and t2 foreach individual specimen must have been less than or equal to 30 seconds; and the total afterflame time for all five specimens (t1 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; but the cotton indicatorcan have been ignited by flaming particles ordrops.

Tensile properties were measured in accordance with ISO 527 at 50 mm/min at room temperature on standard ISO tensile bars.

Environmental stress cracking resistance (ESCR) describes the accelerated failure ofpolymeric materials, as a combined effect ofenvironment, temperature, and stress. The failure mainly depends on the characteristics ofSthe material, chemical, exposure condition, and the magnitude of the stress. The ISO tensile bars were clamped to a semicircular jig to impart a constant strain of 1.0%. The bars were then exposed to SANICLOTH AM3 wipes for three days at 23° C. The criteria forevaluating chemical resistance is shown in Table 2.

TABLE 2

| Rating | Yield Strength (% Retention) | Elongation @ Break (% Retention) | Inference |
|---|---|---|---|
| Compatible | ≥90% | 80-139% | Property retained |
| Marginal | 80-89% | 65-79% | On-set of possible failure |
| Not Compatible | ≤79% | ≤65 or >140% | Craze/crack observed; Plasticization; Specimens softened |

Compositions and test results are shown in Table 3. In Table 3, the amount of each component is provided in weight percent, based on the total weight of the composition.

TABLE 3

| Component | Unit | CEx. 1 | Ex. 1 | CEx. 2 | Ex. 2 | CEx. 3 |
|---|---|---|---|---|---|---|
| PCSi-1 | wt % | | | | | |
| PCSi-2 | wt % | 11.2 | 11.2 | | 15 | 15.0 |
| PCSi-3 | wt % | 5.5 | 5.5 | 11.1 | 10 | 10.0 |
| PC-1 | wt % | 38.16 | 41.16 | 43.96 | 37.01 | 36.87 |
| PC-2 | wt % | 38.15 | 38.15 | 40.95 | 34 | 36.86 |
| TBPP | wt % | 0.09 | 0.09 | 0.09 | 0.09 | 0.09 |
| PETS | wt % | 0.1 | 0.1 | 0.1 | 0.1 | 0.3 |
| KPFBS | wt % | | | | | 0.08 |
| Phosphazene | wt % | | | | | |
| RDX | wt % | | | | | |
| SOLDP | wt % | 6 | 3 | 3 | 3 | |
| UVA | wt % | 0.3 | 0.3 | 0.3 | 0.3 | 0.3 |
| TSAN | wt % | 0.5 | 0.5 | 0.5 | 0.5 | 0.5 |
| Properties | | | | | | |
| HDT | ° C. | 101.75 | 116 | 116 | 116 | 121 |
| INI (23° C.) | J/m | 851.0 | 819 | 747 | 846 | 825 |
| INI (−30° C.) | J/m | 493.0 | 621 | 651 | 677 | 600 |
| MVR | $cm^3$/10 min | 10.42 | 7.6 | 6.3 | 7.4 | 4.4 |
| UL 94 (1.5 mm) | S (t1 + t2) | 11.3 (V0) | 16 (V0) | 16.3 (V0) | 16.7 (V0) | 57.8 (V1) |
| UL94 (1.0 mm) | S (t1 + t2) | | 24 (V0) | | 25 (V0) | — |
| ECSR (tens. elong. retention) | | 3% | 95% | 28% | 96% | 99% |

As shown in Table 3, the compositions of examples 1 and 2 show the use of a high Si-content polycarbonate-siloxane copolymer (PC-Si3) in combination with PC-Si2 and a particular organophosphorus additive. These formulations achieved good flame-retardant properties (short flame out times t1+t2, and associated V0 rating at 1.2 and 1.5 mm) in combination with chemical resistance (i.e., good retention of tensile elongation properties after 3 days of exposure to SANICLOTH AF3 wipes with retention of 90-100% compared to the non-exposed reference). These results were unexpected as typically, inclusion of some flame retardants can compromise chemical resistance. Comparative example 1 shows the result of a higher incorporation of the flame retardant component (i.e., 6 wt % vs. 3 wt %). This composition did not achieve the same high chemical resistance, as evidenced by the low tensile elongation of only 3% after 3 days of exposure to SANICLOTH AF3 wipes. Comparative example 2 includes PCSi-3 alone with no additional PCSi-2 component and has the same overall siloxane content as example 1. However, it can be seen that the tensile elongation retention properties are reduced, at only 28%. Thus, the particular combination of the two polycarbonate-siloxane copolymers provides a technical advantage of improved chemical resistance. Comparative example 3 is similar to example 2 but includes a different flame retardant additive based on a typical flame retardant salt. This composition exhibited good chemical resistance but failed to show the desired flame retardant properties, with V1 already at 1.5 mm thickness.

Thus, the present inventors have shown that a desirable combination of chemical resistance and flame retardancy can be achieved through a specific composition which includes a particular organophosphorus flame retardant and a combination of two different polycarbonate-siloxane copolymers. The compositions can also advantageously retain high heat properties with HDT at 1.82 MPa above 110° C. and good notched impact, even at low temperatures of 600 J/m or higher at −30° C. Thus, a significant improvement is provided by the present disclosure.

Additional compositions are provided in Table 4, where the amount of each component is provided in weight percent based on the total weight of the composition. Example 3 is an additional composition showing that a high Si-content polycarbonate-siloxane copolymer in combination with PC-Si2 and different phosphorus flame retardant, namely phosphazene flame retardant, can achieve the desirable combination of chemical resistance and flame retardancy. Comparative example 4 and Comparative example 10 show that the same resins in combination with RDX or KPFBS cannot achieve sufficient retention of elongation at brake after exposure to AF3. Comparative examples 5 to 7 shows that using SOLDP in combination with only one resin between PCSi-2 or PCSi-3 also cannot achieve good ESCR. Finally, comparative example 8 and 9 show that using one between PCSi-2 and PCSi-3 in combination with PCSi-1 also cannot meeting good chemical resistance, and that only the specific combination of PCSi2 and PCSi3 gives the desired combination of chemical resistance and flame retardancy.

TABLE 4

| Component | Unit | Ex. 3 | CEx. 4 | CEx. 5 | CEx. 6 | CEx. 7 | CEx. 8 | CEx. 9 | CEx. 10 |
|---|---|---|---|---|---|---|---|---|---|
| PCSi-1 | wt % | | | | | | 36.7 | 36.7 | |
| PCSi-2 | wt % | 11.2 | 11.2 | 11.2 | | 22 | | 11.2 | 11.2 |
| PCSi-3 | wt % | 5.5 | 5.5 | | 5.5 | | 5.5 | | 5.5 |
| PC-1 | wt % | 41.2 | 41 | 44.2 | 44.9 | 38.1 | 28.1 | 24.2 | 39.28 |
| PC-2 | wt % | 39.2 | 37.8 | 40.7 | 45.7 | 36 | 25.8 | 24 | 39.2 |
| TBPP | wt % | 0.09 | 0.09 | 0.09 | 0.09 | 0.09 | 0.09 | 0.09 | 0.09 |
| PETS | wt % | 0.1 | 0.1 | 0.1 | 0.1 | 0.1 | 0.1 | 0.1 | 0.1 |
| KPFBS | wt % | | | | | | | | 0.08 |
| Phosphazene | wt % | 2 | | | | | | | |
| RDX | wt % | | 3.5 | | | | | | |
| SOLDP | wt % | | | 3 | 3 | 3 | 3 | 3 | |
| UVA | wt % | 0.3 | 0.3 | 0.3 | 0.3 | 0.3 | 0.3 | 0.3 | 0.3 |
| TSAN | wt % | 0.5 | 0.5 | 0.5 | 0.5 | 0.5 | 0.5 | 0.5 | 0.5 |
| Properties | | | | | | | | | |
| HDT | | 118 | 113 | 113 | 114 | 113 | 111 | 109 | 122 |
| MVR | $cm^3$/10 min | 10 | 8 | 11.5 | 11 | 9 | 9.6 | 11 | 7 |
| UL94 (1.0 mm) | S (t1 + t2) | 30 (V0) | 43 (V0) | 33 (V0) | 30 (V0) | 32 (V0) | 20 (V0) | 19 (V0) | 62 (V1) |
| ECSR (tens. elong. retention) | | 93% | 23% | 15% | 52% | 7% | 2% | 2% | 62% |

This disclosure further encompasses the following aspects.

Aspect 1: A polycarbonate composition comprising: 10 to 99 weight percent, based on the total weight of the polycarbonate composition, of a bisphenol A polycarbonate homopolymer, a first polycarbonate-siloxane copolymer having a siloxane content of 10 to 30 weight percent, based on the total weight of the first polycarbonate-siloxane copolymer; a second polycarbonate-siloxane copolymer having a siloxane content of greater than 30 to 55 weight percent, preferably 35 to 50 weight percent, based on the total weight of the second polycarbonate-siloxane copolymer, wherein the first polycarbonate-siloxane copolymer and the second polycarbonate-siloxane copolymer are present in an amount to provide a total siloxane content of 0.5 to 20 weight percent, based on the total weight of the polycarbonate composition; and 0.5 to 5 weight percent, based on the total weight of the polycarbonate composition, of an organophosphorus flame retardant.

Aspect 2: The polycarbonate composition of aspect 1, wherein a molded sample comprising the polycarbonate composition exhibits: a UL-94 rating of V0 at a thickness of 1.5 millimeters or less; preferably a UL-94 rating of V0 at a thickness of less than or equal to 1.2 millimeters; more preferably a UL-94 rating of V0 at a thickness of less than or equal to 1.0 millimeters; a tensile elongation retention of at least 80% after exposure to SANI-CLOTH AF3 for 72 hours at a temperature of 23° C. under 1% strain; and an Izod notched impact strength of greater than 600 joules per meter at a temperature of 23° C., as determined according to ASTM D256-10; and optionally, one or both of: a heat deflection temperature of greater than 110° C., as determined according to ISO75 at 1.82 MPa; an Izod notched impact strength of greater than 450 joules per meter at a temperature of −30° C., as determined according to ASTM D256-10; or a melt volume rate determined in accordance with ISO1133 under a load of 1.2 kg at 300° C. with a dwell time of 300 seconds of greater than 5.

Aspect 3: The polycarbonate composition of aspect 1 or 2, wherein the bisphenol A polycarbonate homopolymer comprises a linear bisphenol A polycarbonate homopolymer having a weight average molecular weight of 15,000 to 40,000 grams per mole, as determined by gel permeation chromatography relative to linear bisphenol A polycarbonate standards, preferably wherein the bisphenol A polycarbonate homopolymer comprises a linear bisphenol A polycarbonate homopolymer having a weight average molecular weight of 15,000 to 25,000 grams per mole, preferably 17,000 to 25,000 grams per mole, as determined by gel permeation chromatography relative to linear bisphenol A polycarbonate standards; or a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; or a combination thereof.

Aspect 4: The polycarbonate composition of any of aspects 1 to 3, wherein the first polycarbonate-siloxane copolymer and the second polycarbonate-siloxane copolymer each comprise bisphenol A carbonate repeating units and poly(dimethyl siloxane) repeating units.

Aspect 5: The polycarbonate composition of any of aspects 1 to 4, wherein the first polycarbonate-siloxane copolymer has a siloxane content of 15 to 25 weight percent based on the total weight of the first polycarbonate-siloxane copolymer, and the second polycarbonate-siloxane copolymer has a siloxane content of 35 to 50 weight percent based on the total weight of the second polycarbonate-siloxane copolymer.

Aspect 6: The polycarbonate composition of any of aspects 1 to 5, wherein the composition is free of a polycarbonate-siloxane copolymer having a siloxane content that is less than or equal to 10 weight percent based on the total weight of the polycarbonate siloxane.

Aspect 7: The polycarbonate composition of any of aspects 1 to 6, wherein the oligomeric phosphate ester flame retardant comprises 5 to 15 weight percent phosphorus, based on the total weight of the oligomeric phosphate ester.

Aspect 8: The polycarbonate composition of any of aspects 1 to 7, wherein the oligomeric phosphate ester is a solid at room temperature.

Aspect 9: The polycarbonate composition of any of aspects 1 to 8, wherein one or more of the bisphenol A homopolymer carbonate, the first polycarbonate-siloxane copolymer, and the second polycarbonate-siloxane copolymer are derived from post-consumer recycled or post-industrial recycled materials or can be produced from at least one monomer derived from bio-based or plastic waste feedstock.

Aspect 10: The polycarbonate composition of any of aspects 1 to 9, wherein the polycarbonate composition further comprises 0.1 to 10 weight percent, based on the total weight of the polycarbonate composition, of an additive composition, preferably wherein the additive composition comprises an anti-drip agent.

Aspect 11: The polycarbonate composition of any of aspects 1 to 10, wherein the polycarbonate composition further comprises 0.001 to 10 weight percent of an antimicrobial agent.

Aspect 12: The polycarbonate composition of any of aspects 1 to 11, comprising 60 to 90 weight percent, preferably 65 to 85 weight percent of the bisphenol A polycarbonate homopolymer; 5 to 20 weight percent, preferably 5 to 15 weight percent of the first polycarbonate-siloxane copolymer; 3 to 15 weight percent, preferably 3 to 12 weight percent of the second polycarbonate-siloxane copolymer; and 1 to 5 weight percent of the oligomeric phosphate ester flame retardant, each based on the total weight of the polycarbonate composition.

Aspect 13: The polycarbonate composition of aspect 12, wherein the bisphenol A polycarbonate homopolymer comprises a linear bisphenol A polycarbonate homopolymer having a weight average molecular weight of 15,000 to 25,000 grams per mole, preferably 17,000 to 25,000 grams per mole, as determined by gel permeation chromatography relative to linear bisphenol A polycarbonate standards, and a linear bisphenol A polycarbonate homopolymer having a weight average molecular weight of 26,000 to 40,000 grams per mole, preferably 27,000 to 35,000 grams per mole, as determined by gel permeation chromatography relative to linear bisphenol A polycarbonate standards; the first polycarbonate-siloxane copolymer and the second polycarbonate-siloxane copolymer each comprise bisphenol A carbonate repeating units and poly(dimethyl siloxane) repeating units; the first polycarbonate-siloxane copolymer has a siloxane content of 15 to 25 weight percent based on the total weight of the first polycarbonate-siloxane copolymer, and the second polycarbonate-siloxane copolymer has a siloxane content of 35 to 55 weight percent based on the total weight of the second polycarbonate-siloxane copolymer; and the oligomeric phosphate ester flame retardant comprises 5 to 15 weight percent phosphorus, based on the total weight of the oligomeric phosphate ester, preferably wherein the oligomeric phosphate ester is a solid at room temperature, wherein a molded sample of the polycarbonate composition exhibits a UL-94 rating of V0 at a thickness of 1.5 millimeters or less; preferably a UL-94 rating of V0 at a thickness of less than or equal to 1.2 millimeters; more preferably a UL-94 rating of V0 at a thickness of less than or equal to 1.0 millimeters; a tensile elongation retention of at least 80% after exposure to SANI-CLOTH AF3 for 72 hours at a temperature of 23° C. under 1% strain; a heat deflection temperature of greater than 110° C., as determined according to ISO75 under load of 1.8 MPa; an Izod notched impact strength of greater than 600 joules per meter at a temperature of 23° C., as determined according to ASTM D256-10; or an Izod notched impact strength of greater than 450 joules per meter at a temperature of −30° C., as determined according to ASTM D256-10.

Aspect 14: A method of making the polycarbonate composition of any of aspects 1 to 13, the method comprising melt-mixing the components of the composition, and, optionally, extruding the composition.

Aspect 15: An article comprising the polycarbonate composition of any of aspects 1 to 13.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC═CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($—NO_2$), a cyano (—CN), a $C_{1-6}$ alkyl sulfonyl ($—S(═O)_2$-alkyl), a $C_{6-12}$ aryl sulfonyl ($—S(═O)_2$-aryl), a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polycarbonate composition comprising:

10 to 99 weight percent, based on the total weight of the polycarbonate composition, of a bisphenol A polycarbonate homopolymer;

5 to 25 weight percent, based on the total weight of the polycarbonate composition, of a first polycarbonate-siloxane copolymer having a siloxane content of 10 to 30 weight percent, based on the total weight of the first polycarbonate-siloxane copolymer;

2 to 20 weight percent, based on the total weight of the polycarbonate composition, of a second polycarbonate-siloxane copolymer having a siloxane content of greater than 30 to 55 weight percent, based on the total weight of the second polycarbonate-siloxane copolymer;

wherein the first polycarbonate-siloxane copolymer and the second polycarbonate-siloxane copolymer are present in an amount to provide a total siloxane content of 0.5 to 20 weight percent, based on the total weight of the polycarbonate composition; and 0.5 to 5 weight percent, based on the total weight of the polycarbonate composition, of an organophosphorus flame retardant, wherein the composition is free of a polycarbonate-siloxane copolymer having a siloxane content that is less than or equal to 10 weight percent based on the total weight of the polycarbonate siloxane.

2. The polycarbonate composition of claim 1, wherein a molded sample comprising the polycarbonate composition exhibits:

a UL-94 rating of V0 at a thickness of 1.5 millimeters or less;

a tensile elongation retention of at least 80% after exposure to SANI-CLOTH AF3 for 72 hours at a temperature of 23° C. under 1% strain compared to non-exposed reference sample of the same composition, both measured per ISO 527 at a rate of 50 mm/s; and an Izod notched impact strength of greater than 600 joules per meter at a temperature of 23° C., as determined according to ASTM D256-10; and optionally, one or more of:

a heat deflection temperature of greater than 110° C., as determined according to ISO75 at 1.82 MPa;

an Izod notched impact strength of greater than 450 joules per meter at a temperature of −30° C., as determined according to ASTM D256-10; or a melt volume rate determined in accordance with ISO1133 under a load of 1.2 kg at 300° C. with a dwell time of 300 seconds of greater than 5 cubic centimeters per 10 minutes.

3. The polycarbonate composition of claim 1, wherein the bisphenol A polycarbonate homopolymer comprises a linear bisphenol A polycarbonate homopolymer having a weight average molecular weight of 15,000 to 40,000 grams per mole, as determined by gel permeation chromatography relative to linear bisphenol A polycarbonate standards.

4. The polycarbonate composition of claim 1, wherein the first polycarbonate-siloxane copolymer and the second polycarbonate-siloxane copolymer each comprise bisphenol A carbonate repeating units and poly(dimethyl siloxane) repeating units.

5. The polycarbonate composition of claim 1, wherein the first polycarbonate-siloxane copolymer has a siloxane content of 15 to 25 weight percent based on the total weight of the first polycarbonate-siloxane copolymer, and the second polycarbonate-siloxane copolymer has a siloxane content of 35 to 50 weight percent based on the total weight of the second polycarbonate-siloxane copolymer.

6. The polycarbonate composition of claim 1, wherein the organophosphorus flame retardant comprises an oligomeric phosphate ester flame retardant comprising 5 to 15 weight percent phosphorus, based on the total weight of the oligomeric phosphate ester.

7. The polycarbonate composition of claim 1, wherein the second polycarbonate-siloxane copolymer has a weight average molecular weight of 21,000 to 50,000 g/mol, as determined by gel permeation chromatography using a crosslinked styrene-divinyl benzene column, at a sample concentration of 1 milligram per milliliter, and as calibrated with bisphenol A polycarbonate standards.

8. The polycarbonate composition of claim 1, wherein one or more of the bisphenol A homopolymer carbonate, the first polycarbonate-siloxane copolymer, and the second polycarbonate-siloxane copolymer are derived from post-consumer recycled or post-industrial recycled materials or can be produced from at least one monomer derived from bio-based or plastic waste feedstock.

9. The polycarbonate composition of claim 1, wherein the polycarbonate composition further comprises 0.1 to 10 weight percent, based on the total weight of the polycarbonate composition, of an additive composition.

10. The polycarbonate composition of claim 1, wherein the polycarbonate composition further comprises 0.001 to 10 weight percent of an antimicrobial agent.

11. The polycarbonate composition of claim 1, comprising 60 to 90 weight percent of the bisphenol A polycarbonate homopolymer;

5 to 25 weight percent of the first polycarbonate-siloxane copolymer;

2 to 20 weight percent of the second polycarbonate-siloxane copolymer; and 1 to 5 weight percent of an oligomeric phosphate ester flame retardant, each based on the total weight of the polycarbonate composition.

12. The polycarbonate composition of claim 11, wherein the bisphenol A polycarbonate homopolymer comprises a linear bisphenol A polycarbonate homopolymer having a weight average molecular weight of 15,000 to 25,000 grams per mole, as determined by gel permeation chromatography relative to linear bisphenol A polycarbonate standards, and a linear bisphenol A polycarbonate homopolymer having a weight average molecular weight of 26,000 to 40,000 grams per mole, as determined by gel permeation chromatography relative to linear bisphenol A polycarbonate standards;

the first polycarbonate-siloxane copolymer and the second polycarbonate-siloxane copolymer each comprise bisphenol A carbonate repeating units and poly(dimethyl siloxane) repeating units;

the first polycarbonate-siloxane copolymer has a siloxane content of 15 to 25 weight percent based on the total weight of the first polycarbonate-siloxane copolymer, and the second polycarbonate-siloxane copolymer has a siloxane content of 35 to 50 weight percent based on the total weight of the second polycarbonate-siloxane copolymer; and the oligomeric phosphate ester flame retardant comprises 5 to 15 weight percent phosphorus, based on the total weight of the oligomeric phosphate ester, wherein a molded sample of the polycarbonate composition exhibits:

a UL-94 rating of V0 at a thickness of 1.5 millimeters or less; and a tensile elongation retention of at least 80% after exposure to SANI-CLOTH AF3 for 72 hours at a temperature of 23° C. under 1% strain compared to non-exposed reference sample of the same composition, both measured per ISO 527 at a rate of 50 mm/s; and an Izod notched impact strength of greater than 600 joules per meter at a temperature of 23° C., as determined according to ASTM D256-10; and optionally one or more of:

a heat deflection temperature of greater than 110° C., as determined according to ISO75 under load of 1.82 MPa;

or a melt volume rate (MVR) of greater than 5 cubic centimeters per 10 minutes ($cm^3$/10 min), determined in accordance with ISO 1133 under a load of 1.2 kg at 300° C.

13. A method of making the polycarbonate composition of claim 1, the method comprising melt-mixing the components of the composition, and, optionally, extruding the composition.

14. An article comprising the polycarbonate composition of claim 1.

15. The polycarbonate composition of claim 1, wherein the organophosphorus flame retardant comprises a cyclic phosphazene.

16. The polycarbonate composition of claim 1, wherein the second polycarbonate-siloxane copolymer has a siloxane content of 35 to 45 weight percent based on the total weight of the second polycarbonate-siloxane copolymer.

17. The polycarbonate composition of claim 1, wherein the polycarbonate composition further comprises 0.001 to 10 weight percent of a silver-containing antimicrobial agent.

* * * * *